United States Patent Office 3,294,793
Patented Dec. 27, 1966

3,294,793
TETRAHYDRO-1,3,5-OXADIAZIN-4-ONES
Michael C. Seidel, Levittown, Pa., assignor to Rohm & Haas Company, Philadelphia, Pa., a corporation of Delaware
No Drawing. Filed Apr. 30, 1964, Ser. No. 363,986
13 Claims. (Cl. 260—244)

This invention is concerned with tetrahydro-3-(substituted-phenyl)-5-alkyl-1,3,5-oxadiazin-4-ones as new compounds and their method of preparation.

The compounds of this invention may be represented by the formulas:

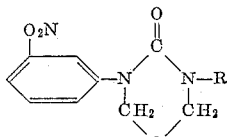
(I)

and

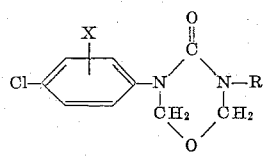
(II)

wherein R is an alkyl group of 1 to 8 carbon atoms and X is hydrogen, methyl or chlorine.

In 1936, Kadowaki in Bull. Chem. Soc., Japan 11, 248 (1936) assigned the name, "uron," to the parent tetrahydro-1,3,5-oxadiazin-4-one. Beachem et al. in J. Org. Chem. 28, 1876–1877 (1963) described the preparation of three urons of the structure:

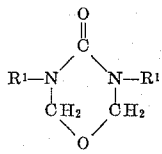
(III)

wherein $R^1$ is hydrogen, methyl or methoxymethyl. N,N'-bis(methoxymethyl)uron was made by reacting urea with formaldehyde in the presence of barium hydroxide followed by subsequent reaction with methanol under acidic conditions; the preparation of this compound is also described in U.S. Patent No. 3,059,027. N,N'-bis-(methoxymethyl)uron, when subjected to hydrogenolysis, produced N,N'-dimethyluron and when subjected to careful hydrolysis gave uron itself. The above describes the previous knowledge on the synthesis of tetrahydro-1,3,5-oxadiazin-4-ones. Neither unsymmetrical urons nor any derived from phenyl ureas have previously been reported.

The compounds of this invention possess excellent herbicidal properties. They have both pre-emergence and post-emergence herbicidal activity and also may be selective in their action. This combination of properties makes them particularly valuable for practical weed control and for the selective control of weed growth in a variety of economic crops.

Illustrative of the compounds of this invention are the following:

Tetrahydro-3-(3-nitrophenyl)-5-methyl-1,3,5-oxadiazin-4-one,
Tetrahydro-3-(3-nitrophenyl)-5-octyl-1,3,5-oxadiazin-4-one,
Tetrahydro-3-(4-chlorophenyl)-5-methyl-1,3,5-oxadiazin-4-one,
Tetrahydro-3-(4-chlorophenyl)-5-ethyl-1,3,5-oxadiazin-4-one,
Tetrahydro-3-(4-chlorophenyl)-5-butyl-1,3,5-oxadiazin-4-one,
Tetrahydro-3-(2,4-dichlorophenyl)-5-methyl-1,3,5-oxadiazin-4-one,
Tetrahydro-3-(2,4-dichlorophenyl)-5-pentyl-1,3,5-oxadiazin-4-one,
Tetrahydro-3-(3,4-dichlorophenyl)-5-methyl-1,3,5-oxadiazin-4-one,
Tetrahydro-3-(3,4-dichlorophenyl)-5-ethyl-1,3,5-oxadiazin-4-one,
Tetrahydro-3-(3,4-dichlorophenyl)-5-isopropyl-1,3,5-oxadiazin-4-one,
Tetrahydro-3-(3,4-dichlorophenyl)-5-butyl-1,3,5-oxadiazin-4-one,
Tetrahydro-3-(3,4-dichlorophenyl)-5-sec-amyl-1,3,5-oxadiazin-4-one,
Tetrahydro-3-(3,4-dichlorophenyl)-5-sec-octyl-1,3,5-oxadiazin-4-one,
Tetrahydro-3-(3-methyl-4-chlorophenyl)-5-methyl-1,3,5-oxadiazin-4-one and
Tetrahydro-3-(2-methyl-4-chlorophenyl)-5-heptyl-1,3,5-oxadiazin-4-one.

A general method of prepaartion of the tetrahydro-1,3,5-oxadiazin-4-ones of this invention comprises reacting a urea of the formula

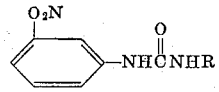
(IV)

and

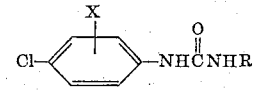
(V)

wherein X and R are as defined above with an essentially anhydrous form of formaldehyde in the presence of an acid catalyst. Using Aryl— as the designation for the substituted-phenyl groups in the urea structures (IV) and (V), the reaction may be written:

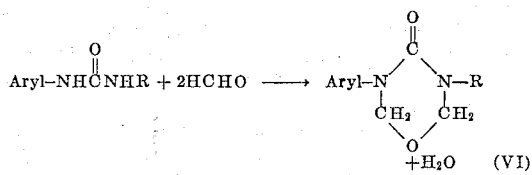
$+H_2O$ (VI)

The 1,3-substituted ureas employed in the above reaction can be prepared by conventional methods, for example, by reaction of a primary amine with an aryl isocyanate.

The following table lists the melting points and literature references of certain of the ureas used as starting materials for the preparation of the tetrahydro-1,3,5-oxadiazin-4-ones of this invention.

TABLE I

Aryl-NHCONHR Compounds

| Compound where— | | Melting Point (° C.) | Reference |
|---|---|---|---|
| Ar= | R= | | |
| 3-NO$_2$C$_6$H$_4$ | CH$_3$ | 142–145 | Weeds 5, 135 (1957). |
| 4-ClC$_6$H$_4$ | CH$_3$ | 202–204 | U.S. Patent 2,655,447. |
| 4-ClC$_6$H$_4$ | C$_2$H$_5$ | 204–206 | Do. |
| 2,4-Cl$_2$C$_6$H$_3$ | CH$_3$ | 209–211 | German Patent 1,102,722. |
| 3,4-Cl$_2$C$_6$H$_3$ | CH$_3$ | 157–159 | U.S. Patent 2,655,447. |
| 3,4-Cl$_2$C$_6$H$_3$ | C$_2$H$_5$ | 177–179 | Do. |
| 3,4-Cl$_2$C$_6$H$_3$ | iso-C$_3$H$_7$ | 205–206 | See Preparation 1, below. |
| 3,4-Cl$_2$C$_6$H$_3$ | C$_4$H$_9$ | 110–113 | Do. |
| 2-CH$_3$-4-ClC$_6$H$_3$ | CH$_3$ | | U.S. Patent 2,655,447. |

A typical preparation of a 1,3-disubstituted urea is given below.

*Preparation 1—1-(3,4-dichlorophenyl)-3-butylurea*

Into a flask provided with a stirrer and a thermometer is placed 28 g. (0.15 mole) of 3,4-dichlorophenyl isocyanate dissolved in 200 ml. of anhydrous toluene. To this there is added with stirring and cooling 15 g. (0.2 mole) of n-butylamine. The reaction mixture is allowed to stand 2 hours and then is filtered. The residue is washed with toluene and air dried to give 38 g. of colorless needles melting at 110° to 113° C. The product is found to contain by analysis 10.52% nitrogen and 27.68% chlorine; calculated for $C_{11}H_{14}Cl_2N_2O$ is 11.16% nitrogen and 28.23% chlorine. It is a 97% yield of 1-(3,4-dichlorophenyl)-3-butylurea.

When an equivalent quantity of isopropylamine is substituted for the butylamine above, 1-(3,4,dichlorophenyl)-3-iso-propylurea is produced as a colorless solid melting at 205° to 206° C.

In like manner, other amines and other isocyanates may be reacted to produce the 1,3-disubstituted ureas required for this invention. Yields are generally 90 to 100%.

The requirements for the acid catalysts which effect the conversion of ureas to tetrahydro-1,3,5-oxadiazin-4-ones (urons) are exacting. Two methods have now been discovered.

Method A

The 1,3-disubstituted urea is reacted with essentially anhydrous formaldehyde, preferably paraformaldehyde, in the presence of sulfuric acid or polyphosphoric acid at about room temperature for several hours. The reaction mixture is then neutralized with alkali to give the desired uron as an insoluble precipitate.

Method B

The 1,3-disubstituted urea is reacted with anhydrous formaldehyde, preferably paraformaldehyde, in the presence of a macroreticular sulfonic acid ion-exchange resin suspended in an essentially anhydrous aromatic hydrocarbon, such as benzene, at reflux temperature. Water is azeotroped out of the reaction until no more is formed. The mixture is then filtered and the product isolated from the filtrate by evaporating or distilling off the solvent. Ion-exchanged resin catalysts suitable for this reaction are of the types discussed in U.S. Patent No. 3,037,052.

Method A is preferred and the variables in this procedure are presented in the following discussion.

Although commercial polyphosphoric acid may be used in the process, sulfuric acid is preferred. Concentrations of sulfuric acid which may be employed are in the range of 65 to 100%, although the preferred range is 80 to 90%.

An essentially anhydrous form of formaldehyde is usually used; however, small amounts of water may be tolerated. For example, there may be used gaseous formaldehyde, trioxane or paraformaldehyde. Paraformaldehyde is preferred.

Theoretically, two molar equivalents of formaldehyde are required for every mole of the urea. Excesses of formaldehyde may be used and 150% of the stoichiometric amount is commonly employed. The amount of the acid used is usually in the range of 5 to 10 parts by weight per part of the starting urea. This amount produces a solution which facilitates the reaction.

The order of addition of the urea, formaldehyde and the acid is immaterial, and the reactants can be added incrementally or totally, as desired.

Temperatures for the reaction may be in the range of 0° to 50° C. and are preferably near room temperature in the 20° to 30° C. range. The reaction is substantially slowed down at temperatures below zero and at temperatures higher than 50° C., resinification predominates.

The reaction rate is relatively rapid at room temperature. An exotherm is usually produced when the reactants are mixed and should be controlled so that the temperature does not rise above 50° C. Very soon after mixing the reactants, a solution results and this can be hastened by having the reactants in a finely divided state or by shaking or stirring. In general, the reaction is complete in a relatively short time; however, when optimum yields are desired, it is often convenient to allow the reaction mixture to stand several hours, for example, 2 to 12 hours, to insure substantial completion of the reaction.

One convenient method used to determine the completeness of the reaction is to examine the infrared spectrum of the products. An incomplete reaction would show absorption in the NH stretching region and the Amide II region, or possibly absorption in the OH stretching region.

The tetrahydro-1,3-5-oxadiazin-4-ones produced by Method A may be isolated by pouring the reaction product into a mixture of excess sodium hydroxide, 50% is commonly used, and crushed ice. The product is stable to alkaline solutions although it may be hydrolyzed by hot mineral acids and this condition is to be avoided. Usually the products are solids and are filtered off and purified by known methods, such as recrystallization. Occasionally, the products are oils which separate as an insoluble layer. These are conveniently extracted with a water-insoluble solvent, such as, for example, an aliphatic or aromatic hydrocarbon or ether-type solvent, and the solvent removed by evaporation or distillation under reduced pressure to obtain the product as a residue. Under conditions in which little decomposition occurs, the oils may be purified by distillation.

When R in this formula was a t-alkyl group, i.e., where the attachment of the nitrogen to the alkyl group was to a carbon containing no hydrogen, the reactions were sluggish and gave low yields.

Typical processes and products of the invention are described in the following illustrative examples.

Example 1

Preparation of tetrahydro-3-(3,4-dichlorophenyl)-5-methyl-1,3,5-oxadiazin-4-one.

*Method A.*—A mixture of 10 g. (0.046 mole) of 1-methyl-3-(3,4-dichlorophenyl)urea and 4 g. (0.13 mole) of paraformaldehyde is dissolved in 110 g. of chilled 85% sulfuric acid. The solution is allowed to stand overnight (16 hours) at room temperature. It is then poured into a mixture of 220 g. of 50% sodium hydroxide and crushed ice to give a solid crystalline precipitate. The solid is filtered off, washed with water, air dried and then recrystallized from an 80:20 mixture of toluene and hexane. There is obtained 11.1 g. of solid melting at 128° to 130° C. This product contains by analysis 46.25% carbon, 4.16% hydrogen and 10.60% nitrogen; calculated for $C_{10}H_{10}Cl_2N_2O_2$ is 46.00% carbon, 3.86% hydrogen and 10.73% nitrogen. It is a 92% yield of tetrahydro-3-(3,4-dichlorophenyl)-5-methyl-1,3,5-oxadiazin-4-one.

*Method B.*—A mixture of 20 g. (0.092 mole) of 1-methyl-3-(3,4-dichlorophenyl)urea and 8 g. (0.26 mole) of paraformaldehyde is added to a suspension of 3 g. of a dry macroreticular sulfonated styrene-divinylbenzene copolymer (available commercially as Amberlyst XN–1005) in 200 ml. of dry benzene. The mixture is refluxed with a Dean Stark trap to remove water and after about one-half hour of refluxing, 2 ml. of water is removed. The mixture is cooled and filtered and the filtrate is evaporated to remove the benzene leaving a sticky solid residue. This is recrystallized from an 80:20 mixture of toluene and hexane to give 15 g. of a somewhat sticky solid. Its infrared spectrum conforms to that of tetrahydro-3-(3,4-dichlorophenyl)-5-methyl-1,3,5-oxadiazin-4-one and as such represents a 63% yield of this product. The solid is further purified by recrystallization from acetone to give 3.5 g. colorless crystals melting at 126° to 129° C.

Example 2

Preparation of tetrahydro-3-(3-nitrophenyl)-5-methyl-1,3,5-oxadiazin-4-one.

A mixture of 15 g. (0.077 mole) of 1-methyl-3-(3-nitrophenyl)urea and 5 g. (0.167 mole) of paraformaldehyde is dissolved in 165 g. of chilled 85% sulfuric acid and allowed to stand overnight. The solution is then slowly poured into a mixture of 250 g. of 50% sodium hydroxide and crushed ice. A light yellow, crystalline precipitate results and is filtered off and air dried. The solid is recrystallized from toluene to give 14.5 g. of yellow crystals melting at 100° to 102° C. This product contains by analysis 50.74% carbon, 5.45% hydrogen and 17.84% nitrogen; calculated for $C_{10}H_{11}N_3O_4$ is 50.63% carbon, 4.68% hydrogen and 17.71% nitrogen. It is a 78% yield of tetrahydro-3-(3-nitrophenyl)-5-methyl-1,3,5-oxadiazin-4-one.

The same product is obtained by employing an equivalent amount of polyphosphoric acid in place of the sulfuric acid.

In a manner as described for Example 2, the following compounds having the characteristics indicated in Table II are prepared.

TABLE II

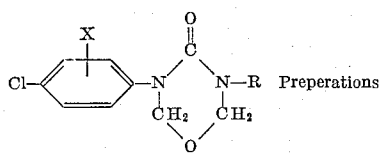 Preperations

| Example | X | R | M.P. (° C.) | Yield (Percent) | Empirical Formula | Analysis | | |
|---|---|---|---|---|---|---|---|---|
| | | | | | | Element | Theory | Found |
| 3 | H | $CH_3$ | 99-101 | 80 | $C_{10}H_{11}ClN_2O_2$ | Cl | 15.64 | 15.72 |
| | | | | | | N | 12.36 | 12.20 |
| 4 | H | $C_2H_5$ | 56-58 | 81 | $C_{11}H_{13}ClN_2O_2$ | Cl | 14.73 | 15.15 |
| | | | | | | N | 11.64 | 11.70 |
| 5 | 2-Cl | $CH_3$ | Oil | 76 | $C_{10}H_{10}Cl_2N_2O_2$ | C | 46.00 | 46.23 |
| | | | | | | H | 3.86 | 4.10 |
| | | | | | | N | 10.73 | 10.47 |
| 6 | 3-Cl | $C_2H_5$ | 75-77 | 51 | $C_{11}H_{12}Cl_2N_2O_2$ | Cl | 25.77 | 25.48 |
| | | | | | | N | 10.18 | 10.27 |
| 7 | 3-Cl | iso-$C_3H_7$ | 93-95 | 68 | $C_{12}H_{14}Cl_2N_2O_2$ | Cl | 24.52 | 24.34 |
| | | | | | | N | 9.69 | 9.49 |
| 8 | 3-Cl | $C_4H_9$ | Oil | 75 | $C_{13}H_{16}Cl_2N_2O_2$ | Cl | 23.39 | 23.16 |
| | | | | | | N | 9.24 | 8.94 |

The tetrahydro-1,3,5-oxadiazin-4-ones of this invention exhibit excellent herbicidal activity on a variety of monocotyledonous and dicotyledonous weeds. They can act as both pre-emergent and post-emergent herbicides. At the same time, there are a number of economic crops which have exhibited tolerance to these chemicals. The active compound is, of course, applied in an amount sufficient to exert the desired herbicidal action. Usually, this is in the range of 0.5 to 20 lb./A. although higher rates up to 100 lb./A. can be used when soil sterilization is desired. For selective weed control in crops, the preferred dosages are 1 to 5 lb./A.

For use as pesticides, the compounds of this invention are usually taken up in a carrier or are formulated so as to render them suitable for subsequent dissemination as pesticides. For example, the tetrahydro-1,3,5-oxadiazin-4-ones may be formulated as wettable powders, emulsion concentrates, dusts, granular formulations, aerosols or flowable emulsion concentrates.

Compositions are prepared from the compounds of this invention by taking them up in an agronomically acceptable carrier, adding surfactants or other additives, if desired, and admixing to give uniformly formulated mixtures. By "agronomically acceptable carrier" is meant any substance which can be used to dissolve, dispense or diffuse the chemical to be used therein without impairing the effectiveness of the toxic agent and which does no permanent damage to such environment as soil, equipment and agronomic crops.

Wettable powders are made by incorporating the tetrahydro-1,3,5-oxadiazin-4-ones in a finely-divided solid carrier and a surfactant which may be one or more emulsifying, wetting, dispersing, or spreading agents or blends of these. Solid carriers suitable for this use are found in the classes of naturally-occurring clays, silicates, silicas, carbonates, limes and organic materials. Typical of these are kaolin, Fuller's earth, talc, diatomaceous earth, magnesium lime, dolomite, walnut shell flour, tobacco dust and sawdust. Commonly used emulsifying and wetting agents include polyoxyethylated alkylphenols, fatty alcohols, fatty acids and alkylamines, alkylarene sulfonates and dialkyl sulfosuccinates; spreading agents include such materials as glycerol mannitan laurate and a condensate of polyglycerol and oleic acid modified with phthalic anhydride; and dispersing agents include such materials as the sodium salt of the copolymer of maleic anhydride and an olefin such as diisobutylene, sodium lignin sulfonate and sodium formaldehyde-naphthalene sulfonates.

Typical wettable powders may contain, for example, 10 to 80% of the tetrahydro-1,3,5-oxadiazin-4-one, and it is usually desirable to add from 1 to 10% by weight of the surfactant; the remainder of the formulation being, of course, the carrier.

Dust concentrates are made by compounding the tetrahydro-1,3,5-oxadiazin-4-one of this invention with inert carriers normally employed for the manufacture of pesticidal dusts for agricultural use, such as talcs, finely particled clays, pyrophyllite, diatomaceous earth, magnesium carbonate, sulfur, or botanical flours such as soybean, wood, wheat, cottonseed and walnut shell. Dust concentrates containing from 20 to 80% of the toxicant are commonly prepared but, as used, the dusts preferably contain 1 to 20% of the active ingredient. Dust concentrates may be conveniently prepared by diluting a wettable powder formulation with the finely particled solid carriers customarily used in pesticidal dusts.

Granular formulations are made by incorporating the tetrahydro-1,3,5-oxadiazin-4-ones into granular or pelletized forms of agronomically acceptable carriers, such as granular clays, vermiculite, charcoal, ground corn cobs, or bran in a range of sizes from 8 to 60 mesh (U.S. Standard Sieve Series sizes). Such granular formulations may be made to contain the compound in from 1 to 50% by weight.

One convenient method for preparing a solid formulation is to impregnate the toxicant onto the solid carrier by means of a volatile solvent, such as acetone. In this manner, adjuvants, such as fertilizers, activators, synergists, adhesives and various surfactants may also be incorporated. Furthermore, pesticides, including insecticides and fungicides, may be used in conjunction with or admixed with the herbicidal agents of this invention.

Emulsion concentrate formulations may be made by dissolving the tetrahydro-1,3,5-oxadiazin-4-ones of this invention in an agronomically acceptable organic solvent and adding a solvent-soluble emulsifying agent. Suitable solvents for these compounds are found in the hydrocarbon, chlorinated hydrocarbon, ketone, ester, alcohol and amide classes of organic solvents, such as xylene, naphthas, ethylene dichloride, cyclohexanone, methyl ethyl ketone, isophorone, methyl hexanoate, or dimethylformamide, the preferred solvents being ketones or ketone-hydrocarbon mixtures. The emulsifying agents may be anionic, cationic or non-ionic in character. Anionic surfactants include alcohol sulfates or sulfonates, alkylarene sulfonates or sulfosuccinates, such as calcium dodecylbenzenesulfonate or sodium dioctyl sulfosuccinate. Cationic surfactants include fatty acid alkyl amine salts and fatty acid alkyl quaternaries, such as laurylamine hydorchloride or lauryldimethylbenzylammonium chloride. Non-ionic emulsifying agents which may be used include ethylene oxide adducts of alkylphenols, fatty alcohols, mercaptans or fatty acids, such as polyethylene glycol esters of stearic acid or polyethylene glycol ethers of palmityl alcohol or of octylphenol having from about 7 to 100 ether groups. The concentration of the active ingredients may vary from 10 to 80%, but is preferably 25 to 50%, and the concentration of the emulsifying agents is usually 0.5 to 10% by weight, with the remainder of the formulation being the carrier.

Standard greenhouse procedures were used for determining the herbicidal activity of the tetrahydro-1,3,5-oxadiazin-4-ones of this invention. These methods comprise planting crop and weed seeds in soil in suitable containers, allowing the seeds to germinate and the seedlings to develop, and treating the resulting plants with aqueous sprays of the test compounds about two weeks after the seeds are planted. The sprays are applied at a standard carrier rate of about 50 gallons per acre, and the concentration is varied to give desired dosages, such as from 1 to 10 lbs./A. About two weeks after application of the chemicals, the state of growth and the phytotoxic effects are evaluated. This type of test constitutes a post-emergence one; a similar test wherein the test compounds are applied immediately after the seeds are planted is a pre-emergence one.

In tests involving the typical monocotyledonous weeds, foxtail (*Setaria glauca*) and wildoat (*Avena fatua*), and the typical dicotyledonous weeds, velvetleaf (*Abutilon theophrasti*) and curly dock (*Rumex crispus*), the following results were obtained.

TABLE III

*Percent phytotoxicity in post-emergence test at 10 lb./A.*

| Compound of Example | Foxtail | Wildoat | Velvetleaf | Curly Dock |
|---|---|---|---|---|
| 1 | 100 | 80 | 100 | 100 |
| 2 | 90 | 50 | 50 | 40 |
| 3 | 90 | 100 | 100 | 100 |
| 4 | 75 | 80 | 100 | 100 |
| 5 | 100 | 85 | 100 | 90 |
| 6 | 100 | 100 | 100 | 100 |
| 7 | 100 | 100 | 95 | 100 |
| 8 | 95 | 80 | 95 | 95 |

TABLE IV

*Percent phytotoxcity in pre-emergence test at 10 lb./A.*

| Compound of Example | Foxtail | Wildoat | Velvetleaf | Curly Dock |
|---|---|---|---|---|
| 1 | 90 | 80 | 100 | 90 |
| 2 | 20 | 20 | 60 | |
| 3 | 100 | 30 | 100 | 80 |
| 4 | 20 | 20 | 60 | 10 |
| 5 | 30 | 30 | 30 | 40 |
| 6 | 40 | 20 | 70 | 30 |

Other tests involved the monoctyledonous (Mono) plants, crabgrass (*Digitaria sanguinalis*), foxtail (*Setaria glauca*), millet (*Setaria italica*), rice (*Oryza sativa*) ryegrass (*Lolium multiflorum*), Sudangrass (*Sorghum sudanensis*), wheat (*Triticum vulgare*) and wildoat (*Avena fatua*), and the dicotyledonous (Di) plants, carpetweed (*Mollugo verticillata*), curly dock (*Rumex crispus*), flax (*Linum usitatissimum*), Indian mallow (*Abutilon theophrasti*), lambsquarters (*Chenopodium album*), lespedeza (*Lespedeza stipulacea*), mustard (*Brassica kaber*), pigweed (*Amaranthus retroflexus*), soybean (*Soja max*), tomato (*Lycopersicum esculentum*) and wild carrot (*Daucus carota*).

Results are recorded as the average percent kill for all the test plants involved. Table V gives the data recorded at 3 lb./A.

TABLE V

*Herbicidal data at 3 lb./A. average percent kill*

| Compound of Example | Pre-Emergence | | Post-Emergence | |
|---|---|---|---|---|
| | Mono | Di | Mono | Di |
| 1 | 33 | 45 | 73 | 100 |
| 3 | 27 | 42 | 64 | 99 |
| 4 | | | 33 | 74 |
| 5 | | | 50 | 82 |
| 6 | | | 61 | 85 |
| 7 | | | 56 | 74 |
| 8 | | | 50 | 71 |

The data in Tables III, IV and V demonstrate outstanding post-emergence and good pre-emergence activities for these tetrahydro-1,3,5-oxadiazin-4-ones.

In combination pre-emergence herbicide and crop tolerance tests, representative crops consisting of corn (*Zea maize*), cotton (*Gossypium herbaceum*), oats (*Avena sativa*), sorghum (*Sorghum vulgare*), soybeans (*Soja max*), tomatoes (*Lycopersicum esculentum*) and wheat (*Triticum vulgare*) were planted in rows in trays and seeds of crabgrass (*Digitaria sanguinalis*), lambsquarters (*Chenopodium album*) and pigweed (*Amaranthus retroflexus*) were broadcast over the planted area and lightly covered with soil. The trays were then treated with tetrahydro-3 - (3,4 - dichlorophenyl)-5-methyl-1,3,5-oxadiazin-4-one (Example 1), tetrahydro-3-(4-chlorophenyl)-5-methyl-1,3,5-oxadiazin-4-one (Example 3) and tetrahydro-3-(3,4-dichlorophenyl)-5-isopropyl-1,3,5 - oxadiazin-4-one (Example 7) at either 2, 3 or 6 lbs./A. and a rate of about 50 gal./A. The trays were then stored in the greenhouse for three weeks, except for oats, which were maintained for two weeks, at which time observations were made as to percent phytotoxicity. Table VI gives the results.

TABLE VI

*Percent phytotoxicity*

| | Compound of— | | | | | | | | |
|---|---|---|---|---|---|---|---|---|---|
| Species | Example 1 (lb./A.) | | | Example 3 (lb./A.) | | | Example 7 (lb./A.) | | |
| | 2 | 3 | 6 | 2 | 3 | 6 | 2 | 3 | 6 |
| Corn | | 0 | 0 | | 0 | 0 | | 0 | 0 |
| Cotton | 0 | | | 0 | | | 0 | | |
| Oats | | 10 | 10 | | 0 | 0 | | 0 | 10 |
| Sorghum | 0 | | | 0 | | | 0 | | |
| Soybeans | 0 | 0 | 0 | 0 | 0 | 0 | 0 | 0 | 0 |
| Tomatoes | | 80 | 65 | | 30 | 75 | | 0 | 0 |
| Wheat | | 0 | 0 | | 0 | 0 | | 0 | 0 |
| Crabgrass | 90 | 100 | 100 | 75 | 50 | 80 | 40 | | 80 |
| Lambsquarters | | 100 | 100 | | 80 | 80 | | 60 | 70 |
| Pigweed | 100 | 95 | 95 | 100 | 80 | 80 | 60 | 60 | 70 |

Other crop tolerance tests were run in which the tolerance to post-emergence applications was measured.

In this test, the planted seeds germinated and the seedlings were allowed to grow for 15 days before treatment with tetrahydro-3(3,4-dichlorophenyl)-5-methyl-1,3,5 - oxadiazin-4-one and tetrahydro-3-(4-chlorophenyl)-5-methyl-1,3,5-oxadiazin-4-one at 1–4 lbs./A. Cotton, peas (*Pisum arvense*) and sorghum showed acceptable tolerance. Similarly, corn, cotton, soybeans and wheat showed tolerance to tetrahydro-3-(3,4-dichlorophenyl)-5-isopropyl - 1,3,5-oxadiazin-4-one.

Thus, a number of valuable economic crops have been shown to possess tolerance to weed-controlling rates of pre-emergence and post-emergence applications of representative compounds of this invention.

Representative compounds were evaluated as aquatic herbicides. For this test, duckweed (*Lemna minor*) was cultured in a 25 gallon polyethylene-lined vat containing water and a small amount of soil. The pH was maintained at 6.0. Aqueous solutions or suspensions of the test compound were made to contain 1, 5 and 10 p.p.m. To 200 ml. portions of these concentrations of the test compound was added a pinch of the duckweed. Untreated controls and a standard aquatic herbicide of the quaternary ammonium type were included in the test. The tests were maintained in a greenhouse under standard conditions of temperature and humidity for two weeks and then were visually rated for toxicity and growth. The following results were obtained (Table VII).

TABLE VII

*Percent phytotoxicity to duckweed*

| Compound of Example | Concentration (p.p.m.) | | |
|---|---|---|---|
| | 1 | 5 | 10 |
| 2 | 40 | 100 | 100 |
| 7 | 50 | 90 | 100 |

In the above duckweed test, the ureas from which the urons of Examples 2 and 7 are prepared exhibit almost no toxic action on this aquatic weed.

This invention provides new compositions of matter in the uron series of compounds and a novel and practical method for preparing them. They are particularly valuable herbicidal agents, since they provide new and economic agents having both selective pre- and post-emergence herbicidal properties.

I claim:

1. A compound selected from the group consisting of $O_2N$-C$_6$H$_4$-N(CH$_2$OCH$_2$)N-R (tetrahydro-1,3,5-oxadiazin-4-one with O$_2$N-phenyl)

and

Cl-(X)-C$_6$H$_3$-N(CH$_2$OCH$_2$)N-R (tetrahydro-1,3,5-oxadiazin-4-one with Cl,X-phenyl)

wherein R is an alkyl group of 1 to 8 carbon atoms and X is a member of the group selected from hydrogen, methyl and chlorine.

2. A compound selected from the group consisting of $O_2N$-C$_6$H$_4$-N(CH$_2$OCH$_3$)N-R and Cl-(X)-C$_6$H$_3$-N(CH$_2$OCH$_2$)N-R wherein R is an alkyl group of 1 to 8 carbon atoms and X is chlorine.

3. A compound selected from the group consisting of $O_2N$-C$_6$H$_4$-N(CH$_2$OCH$_2$)N-R and Cl-(X)-C$_6$H$_3$-N(CH$_2$OCH$_2$)N-R wherein R is methyl and X is chlorine.

4. Tetrahydro - 3 - (4-chlorophenyl)-5-methyl-1,3,5-oxadiazin-4-one.

5. Tetrahydro - 3-(3,4-dichlorophenyl)-5-methyl-1,3,5-oxadiazin-4-one.

6. Tetrahydro - 3 - (4-chlorophenyl)-5-ethyl-1,3,5-oxadiazin-4-one.

7. Tetrahydro - 3 - (3,4-dichlorophenyl)-5-ethyl-1,3,5-oxadiazin-4-one.

8. Tetrahydro - 3 - (3,4-dichlorophenyl)-5-isopropyl-1,3,5-oxadiazin-4-one.

9. A process for preparing tetrahydro-1,3,5-oxadiazin-4-ones selected from the group consisting of $O_2N$-C$_6$H$_4$-N(CH$_2$OCH$_2$)N-R and Cl-(X)-C$_6$H$_3$-N(CH$_2$OCH$_2$)N-R wherein R is an alkyl group of 1 to 8 carbon atoms and X is a member of the group selected from hydrogen, methyl and chlorine, which comprises contacting in the temperature range of about 0° to 50° C. a urea selected from the group consisting of $O_2N$-C$_6$H$_4$-NHC(O)NHR and Cl-(X)-C$_6$H$_3$-NHC(O)NHR wherein R and X are as defined above with formaldehyde in the presence of an acid selected from the group consisting of sulfuric and polyphosphoric acids and isolating said tetrahydro-1,3,5-oxadiazin-4-one from the reaction mixture.

10. A process according to claim 9 wherein the reaction is conducted in the temperature range of about 0° to 50° C. and the acid employed is sulfuric acid.

11. A process according to claim 9 wherein the reaction is conducted in the temperature range of 20° to 30° C. and formaldehyde is employed in at least two molar equivalents.

12. A process according to claim 9 wherein the reaction is conducted in the presence of 65 to 100% sulfuric acid.

13. A process according to claim 9 wherein the reaction is conducted in the temperature range of about 20° to 30° C. and in the presence of 80 to 90% sulfuric acid.

No references cited.

JOHN D. RANDOLPH, *Primary Examiner.*

WALTER A. MODANCE, R. T. BOND,
*Assistant Examiners.*